United States Patent

[11] 3,572,939

[72] Inventor Bruce C. Burdick
Pittsford, N.Y.
[21] Appl. No. 746,571
[22] Filed July 22, 1968
[45] Patented Mar. 30, 1971
[73] Assignee Eastman Kodak Company
Rochester, N.Y.

[54] PHOTOELECTRIC LENS BENCH AND METHOD FOR TESTING OPTICAL SYSTEMS
11 Claims, 18 Drawing Figs.

[52] U.S. Cl. .................................................. 356/124, 356/126
[51] Int. Cl. .................................................. G01b 9/00
[50] Field of Search ...................................... 356/124, 126

[56] References Cited
FOREIGN PATENTS
970,369  9/1964  Great Britain ................ 356/124
OTHER REFERENCES Lambert; R. L., " Relationship between the sine-wave response and the distribution of energy in the optical image of a line." Journal of the Optical Society of America Vol. 48, No. 7. Jul. 1958. p. 490— 495.

Fisher; M. R., et al. " Laboratory Determination of MTF from Line Spread Function." Journal of the Optical Society of America Vol. 57, No. 11. Nov. 1967. p. 1409.

Primary Examiner—Ronald L. Wibert
Assistant Examiner—T. Major
Attorneys—Robert W. Hampton and James A. Smith ABSTRACT: An improved method and apparatus for testing optical systems utilizing one or more cosine potentiometers to correct for errors resulting from perspective and magnification foreshortening or lengthening when off-axis measurements are made.

Patented March 30, 1971

BRUCE C. BURDICK
INVENTOR

BY

ATTORNEYS

Patented March 30, 1971

BRUCE C. BURDICK
INVENTOR

BY

Robert W Hampton
ATTORNEYS

BRUCE C. BURDICK
INVENTOR

BY
ATTORNEYS

Patented March 30, 1971 3,572,939

BRUCE C. BURDICK
INVENTOR

BY

ATTORNEYS

PHOTOELECTRIC LENS BENCH AND METHOD FOR TESTING OPTICAL SYSTEMS

BACKGROUND OF THE INVENTION

The present invention relates to methods and apparatus for testing optical systems, such as lenses, and more particularly to improved methods and apparatus for measuring the ability of a test lens to transmit various contrast ratios present in a test object or target to determine the overall quality of the test lens. More specifically, the invention provides for the correction of magnification and perspective foreshortening or lengthening errors which arise during lens testing with prior art testing methods and apparatus under certain testing conditions when the the test object is spaced from the optical axis of the test lens or positioned in a plane disposed at an angle to the principal plane of the test lens and the test image.

While applicable to different types of optical testing, the invention has particular utility with methods and apparatus which employ a test object of variable light intensity, such as a lined screen or target, for determining the quality of lens systems. Such a method and apparatus are disclosed, for example, in British Pat. No. 970,369, which issued on Sept. 23, 1964, in the name of Lionel R. Baker et al. As is more fully explained in said Baker patent, aberrations and other defects in a lens affect the ability of the lens to reproduce spatial-frequency components of a subject or test object. An electronic comparison of such an object with the corresponding image formed by the test lens yields a response, which varies with the spatial frequency and which is a function of lens quality. This function, sometimes referred to as a Modulation Transfer Function (MTF), is usually expressed as the variation of the lens response with change in spatial frequency.

In order to determine this function, a test object having a varying spatial frequency is constructed in an object plane of the test lens, and the corresponding image formed by the test lens is scanned to provide a test signal. The amplitudes of the test signal, representing the amplitudes of the image spatial-frequency components, mathematically or electrically define the transmission response of the test lens as a function of the spatial frequency of the object, and can be used to calculate the Modulation Transfer Function. While this transfer function can be expressed in numerous ways, one widely accepted equation for calculating the function for any given object spatial-frequency is: $MTF = a/b$; where $a$ is the peak amplitude of the spatial-frequency components of the image produced by the test lens, and $b$ is the average value of the amplitudes.

Figure 3:
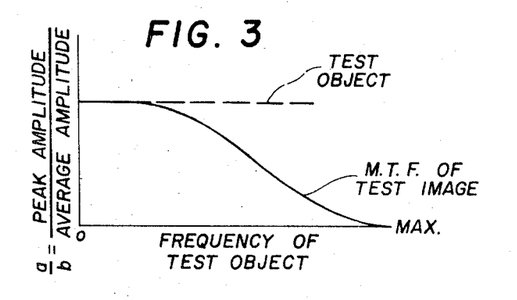
FIG. 3 shows a sample curve in a solid line representing the Modulation Transfer Function (peak amplitude divided by average amplitude) of a test lens plotted as the ordinate against the spatial frequency of the test object as the abcissa; and also, in dotted line, a similar curve of peak amplitude divided by average amplitude for the test object.

In order to analyze the quality of particular optical components, a curve may be plotted illustrating the relationship between the MTF of the test lens and the spatial frequency of the test object in the image plane from 0 spatial frequency to some maximum value. An example of such a curve appears in solid lines on FIG. 3; superimposed upon a similar curve in dotted lines of the peak amplitude divided by the average amplitude, of the test object, versus the spatial frequency of the test object.

To produce an electrical display of the MTF curve for the test lens, a suitable test object of constantly varying spatial frequency can be formed and scanned by orbitally rotating a target disc having an optical pattern of radially oriented lines and spacings on one side of a first elongated light-transmitting slit (sometimes referred to as the object slit or preslit). An image of the test object at the other side of the first or object slit is formed by the test lens at a second light-transmitting slit (sometimes referred to as the image slit), perpendicularly oriented with respect to the object slit. Only a small portion of the spatial frequency pattern is transmitted through both slits. This transmitted portion is scanned before a receiver such as a photomultiplier tube, to generate an electrical signal representing the test image. As the spatial frequency of the object changes, the maximum or peak amplitudes of the electrical signal representing the image change. These peak amplitudes, as well as the average value of the amplitudes, are used electrically to calculate the MTF of the test lens in accordance with the formula previously set forth. The signal representing MTF is then fed to the $y$-axis electrodes of a cathode ray tube or other readout device. The $x$-axis electrodes, on the other hand, receive a modified signal from the target disc representing the actual spatial frequency of the test object.

Previously known methods and apparatus of this general type are subject to certain errors which are introduced when off-axis measurements are made or when the target or test object is oriented at an angle to the principal plane of the test lens and test image. For example, as will be described more fully hereinafter, such errors can result from magnification or perspective foreshortening or lengthening which may arise when a spatial frequency target, such as an optical line screen, is positioned off the axis of the test lens or in a plane skewed with respect to the principal plane of the test lens and test image. When such perspective or magnification foreshortening or lengthening is present, the spatial frequency seen through the test lens will not be the same as the actual spatial frequency of the object, and, unless corrected, the spatial frequency represented by the $x$-axis of the readout device will not be the same as the spatial frequency actually seen through the lens.

SUMMARY OF THE INVENTION

An object of the present invention is to provide an improved method and apparatus, for testing optical systems, which take into account and correct for the above noted errors (to be described more fully hereinafter) that may be introduced when the test object is positioned off-axis from the test lens or at an angle to the test image.

In a disclosed embodiment of the invention, one or more function generators may be provided in a system of the described type to modify the signal representative of the test object or target in accordance with the angular displacement of the object relative to the principal plane of the lens and test image. More specifically, the signal representing the actual spatial frequency of the target may be modified by function generators such as cosine potentiometers whenever the test object is off-axis or angled with respect to the lens and test image. The signal may thus be modified to correctly represent the spatial frequency actually "seen" through the test lens, before the signal is fed to a readout device, such as a plotter or cathode ray tube.

Other objects and advantages will become apparent from the following description of an illustrative preferred embodiment of the invention.

DETAILED DESCRIPTION OF PREFERRED EMBODIMENTS

Figures 1, 8:
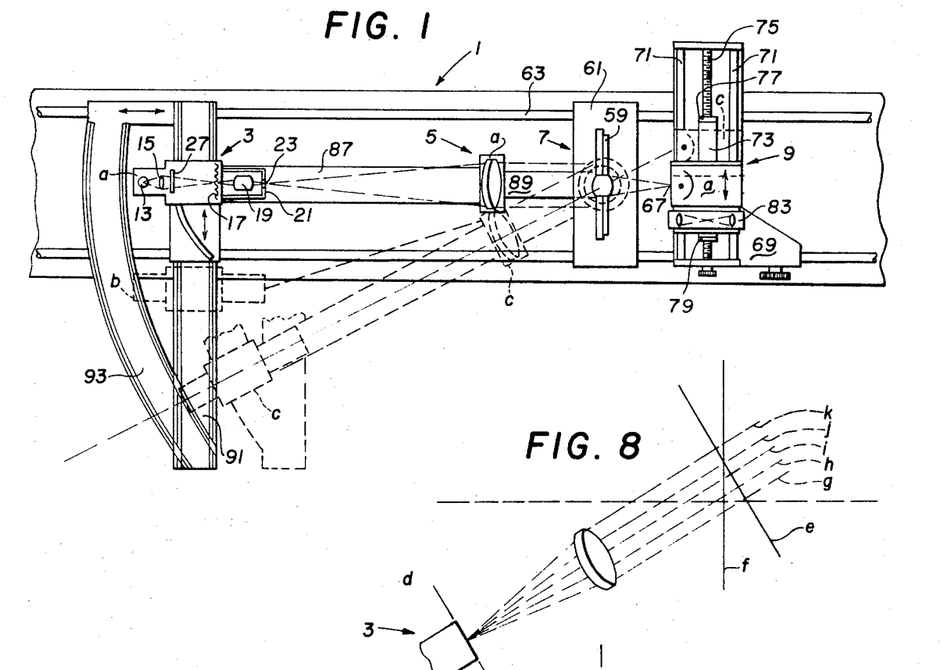
FIG. 1 is a plan view of one embodiment of an optical bench in accordance with the present invention, showing the general features of the bench.
FIG. 8 (sheet 1 of the drawings) is a diagrammatic view representing the manner in which perspective error might occur when the object plane is at an angle to the image plane.
Figure 6:
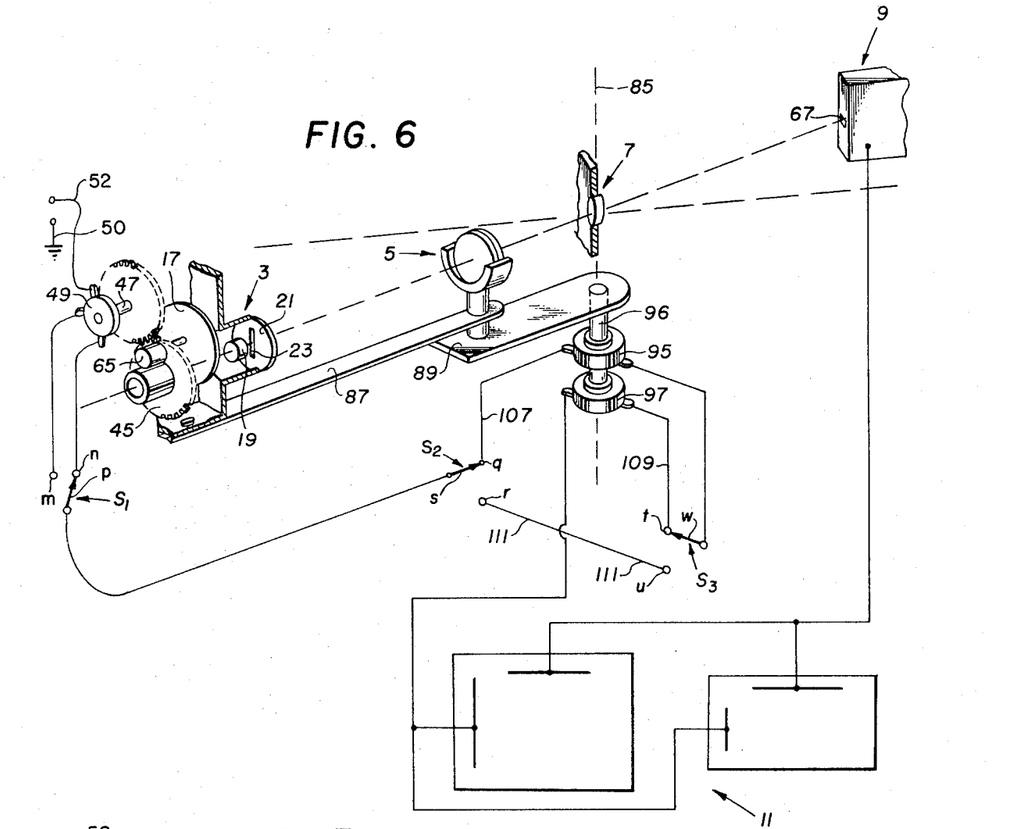
FIG. 6 is a schematic view of the optical bench and associated electrical circuitry, showing the same in a mechanical format.

Referring to FIGS. 1 and 6 of the drawings, a preferred embodiment of an optical bench incorporating the present improvement comprises a support or base 1 on which are supported an object generator 3, a collimator 5, a lens holding unit 7, a photoelectric reciever 9, and a readout or display system 11 (see FIG. 6). Referring in detail to object generator 3, disclosed most clearly in FIGS. 1 and 4, a source of illumination such as a tungsten-halogen lamp 13 generates light ray which pass through a condenser or positive lens 15 to illuminate a target of variable light intensity which may take the form of a circular-lined disc or screen 17. A zoom relay 19 forms an image of the target on an opaque member such as a plate 21 defining an elongated opening or light transmitting slit 23 therein which can be rotated for horizontal as well as vertical orientations. One of a plurality of spectral filters 25, mounted on a rotatable disc 27, may be placed between light source 13 and slit 23 to alter the spectral composition of the object formed by object generator 3.

Figure 4:
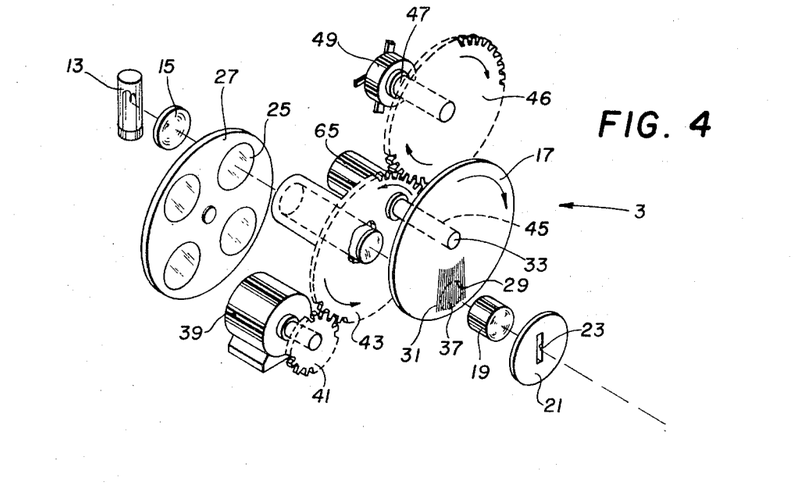
FIG. 4 is a perspective schematic view of an object forming apparatus in accordance with the disclosed embodiment of the present invention, showing a target disc and the manner in which it is orbitally rotated with respect to a first elongated light transmitting slit.

Target 17 is shown as a glass disc having a radial line screen thereon of approximately 10 lines per millimeter spatial frequency in the area 29 illuminated by lamp 13. The widths of lines 31 on line screen or target 17 are tapered, and the lines are located such that, at any given radius from the center 33 of target 17, the width of any line is equal to the space between the lines. Moreover, the lines in the area 29 are sufficiently distant from center 33 to be effectively parallel.

In order to vary the spatial frequency of the object, target 17 is mounted eccentrically of its center 33 to rotate about axis 37 which extends through the center of slit 23. As can be seen more clearly in FIGS. 5a—5c, rotation of the target about axis 37 will generate an object of varying spatial frequency at slit 23.

Figure 5A:
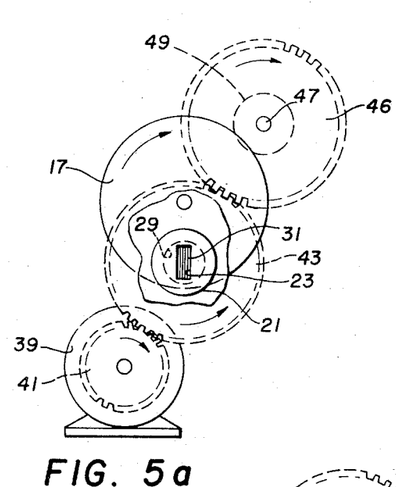
FIGS. 5a, 5b, and 5c are schematic views of a portion of the object forming apparatus of FIG. 4, showing the manner in which the spatial frequency of the object is varied from zero to some maximum value and also showing the manner in which the object of is scanned, by orbitally rotating a lined target on one side of an elongated light transmitting slit.
Figure 5B:
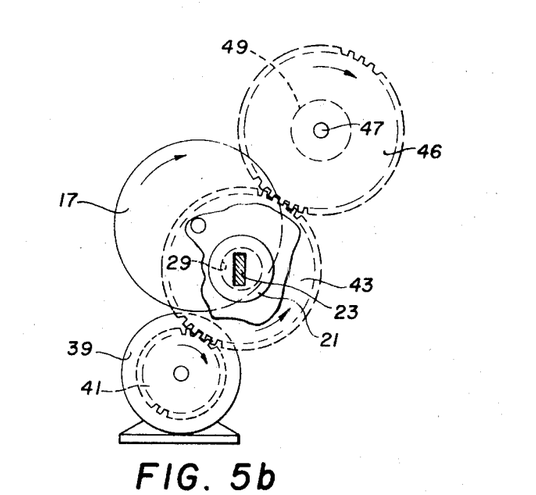
Figure 5C:
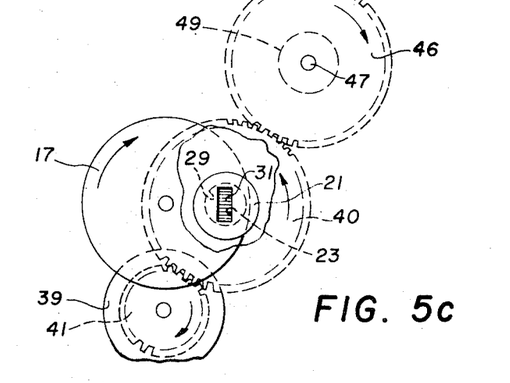

As shown on FIG. 5a, when lines 31 of screen 17 are oriented in the same direction as slit 23, the spatial frequency will be zero, since less than one entire line or space, both of which are wider than the slit, will be visible through the slit. When the target is rotated such that lines 31 are perpendicular to slit 23, as shown in FIG. 5c, the spatial frequency will be maximum, and a maximum number of lines and spaces will be visible through the slit. At intermediate orientations of the target, as represented in FIG. 5b, the spatial frequency will be some intermediate value.

Target 17 is rotatably driven about axis 37 at a constant angular velocity by means of a synchroneous motor 39, a spur gear 41 and a driven gear 43 upon which the target is mounted by shaft 45. As described above, such rotation about axis 37 will change the spatial frequency of the object generated as said object is viewed from the side of slit 23 opposite from target 17. While the target is rotated at a constant angular velocity, the rate of change of the spatial frequency of the target varies as a function of the sine or cosine of the angle of target rotation, depending on the orientation of slit 23.

In order to obtain a signal representing the spatial frequency of the test object at any instant in time, a second driven gear 46 engages first driven gear 43 and rotates in response to rotation of gear 43, and target 17, about axis 37. Gear 46 is connected via shaft 47 to a function generator 49, which in the disclosed embodiment takes the form of a sine-cosine potentiometer, such that an electrical signal established by the potentiometer will be directly proportional to the spatial frequency of the test object or pattern at slit 23.

Figure 7:
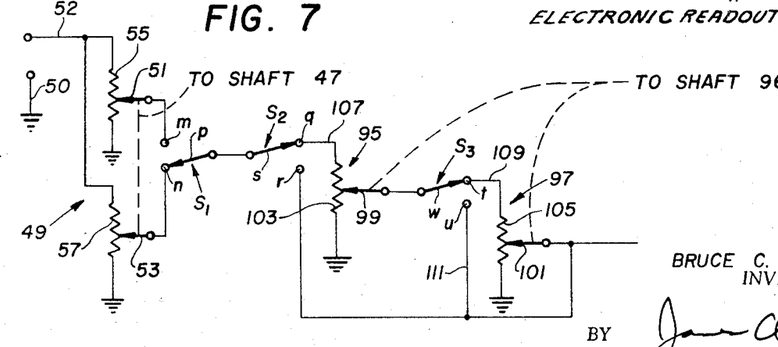
FIG. 7 is a schematic diagram of the circuitry of FIG. 6, showing such circuitry in an electrical format.

As shown in FIG. 7 the sine-cosine potentiometer 49 may comprise a pair of side-wire resistance windings 55 and 57, each of which electrically has one end 50 connected to ground and the other 52 connected to one terminal of a voltage source, as indicated schematically. A pair of movable slider contacts 51 and 53 are connected electrically to fixed contacts $m$ and $n$ of a single-pole double-throw switch S1, and mechanically to the shaft 47 of gear 45. Contacts 51 and 53 are thus positioned along the resistance windings 55 and 57, respectively, in response to rotation of the shaft 47, and target 17, and develop potentials at contacts $m$ and $n$ related to the angular position of target 17. The windings of resistance 55 is arranged to develop a nonlinear potential at contact $m$ related to a cosine function of the angle of rotation of target 17. Similarly, the winding of resistance 57 is arranged to develop a nonlinear potential at contact $n$ related to a sine function of the angle of rotation of target 17. As will be later described in connection with operation of the system, a movable contact arm $p$ of switch S1 may be selectively positioned to introduce either the sine or cosine function into the system.

Sine and cosine potentiometers of the type described are per se well known to those skilled in the art and may take various forms other than that shown. For example, the resistances 55 and 57 may comprise diametrically opposed circular resistance sections and contact arms 55 and 57 could comprise a single arm arranged to selectively cooperate with either section.

Since the spatial frequency of the test object changes by either a sine or cosine function in proportion to the amount of rotation of target 17, the output of the sine-cosine potentiometer can be used to represent the actual spatial frequency of the test object at any point in time. Provision of a sine-cosine potentiometer for this purpose, instead of only one or the other, permits an advance of the signal electrically by 90°, for example when slit 23 is advanced mechanically by 90°.

As will be described more fully hereinafter, the output signal from sine-cosine potentiometer 49, representing the actual spatial frequency of the target, may be further modified to compensate for discrepancy between the spatial frequency of the object as "seen" through the lens, or through the lens from the image plane, and the actual spatial frequency of the object. The output signal from the sine-cosine potentiometer, after any such further modification can then be fed to the readout or display system 11.

The maximum value of spatial frequency of the test object can be varied by adjustment of relay or zoom lens 19. As the magnification power of relay 19 is increased, the maximum spatial frequency of the object formed by the line grating on the other side of slit 23 will be reduced.

In order to provide for the testing of lenses with objects at infinite conjugates as well as finite conjugates, the detachable collimator 5 can be positioned between the test object and test lens. With the object located at the infinity focus of the collimator, the test lens will effectively see an object at infinity, from which only parallel rays will enter the test lens. As will be described more fully hereinafter, collimator 5 is mounted for rotation about an axis through the pupil of the test lens such that it can always be positioned in line between the test lens and the object generator regardless of the position of the object generator.

The test lens is precisely located with respect to other units of the bench, such as the collimator and the object generator, by means of one or more interchangeable V-shaped members 59 (FIG. 1). Members 59, in turn, are mounted on rectangular plate 61 and slide-bars 63 for adjustable movement longitudinally of the bench.

In order to generate a meaningful readout indicative of the MTF of the test lens, the object is scanned to produce an effect which is detected by a photoelectric receiver 9, in the form of a photomultiplier in the disclosed embodiment, which generates an electrical signal representing the light intensity of the components of the test image. While this scanning effect could be accomplished in any number of ways, target 17 is shown in FIG. 4 as being mounted on shaft 45 for rotation by motor 65 about center 33 to scan the object before reciever 9. From FIGS. 4 and 5a—5c, it should now be apparent that the frequency components of the object will be constantly moving in a direction lengthwise of slit 23.

In order to limit the image area scanned by the photomultiplier a second image slit 67, perpendicular to slit 23, is positioned at the image plane in front of receiver 9. Thus the reciever will view only a small square of the image at any particular instant in time while rotation of target 17 about its center 33 will effectively scan the object, and therefore also the image, before the photomultiplier. At the same time rotation of target 17 about axis 37 will continuously vary the spatial frequency of the test object. Thus, it can be seen that the complex orbital movement of the test object serves the first function of varying the spatial frequency of the object and at the same time effectuates a scanning of the test image before the receiver.

Receiver 9 is securely mounted on a base 69 which, in turn is slidably received on rails 71 and slide bar 73 for sliding movement perpendicular to base or support 1. Slide bar 73, in turn, is supported on lead screw 75 for movement along rails 71. Aligning stops 77 and 79 at the ends of slide bar 73 are precisely spaced such that base 69 can be moved into contact with stop 79, and knob 81 can be adjusted until image slit 67 and reciever 9 are properly oriented with respect to the test image. Thereafter, base 69 can be shifted along slide bar 73 into a position contacting stop 77 and such shifting will automatically position a second unit, such as parfocal microscope 83 in proper position with respect to the lens.

Figure 2:
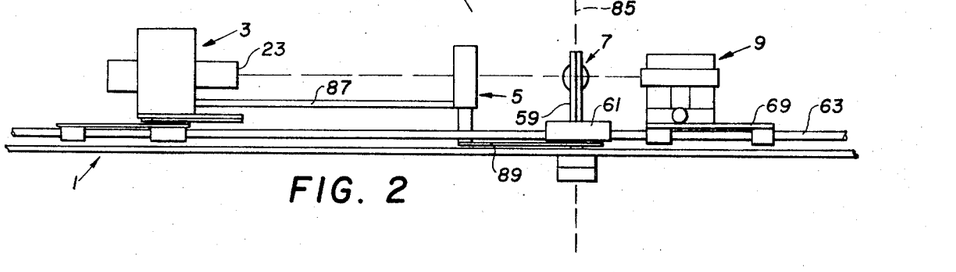
FIG. 2 is a side elevational view of the bench depicted in FIG. 1, showing further general features of the bench and also the manner in which one or more function generators can be mechanically arranged on the bench.

Referring now in particular to the manner in which off-axis measurements are made, and to FIGS. 1, 2, and 6, object generator 3 is mounted for pivotal movement about an axis 85 (FIG. 6) directly below the entrance pupil of the test lens. During any such pivotal movement for measurements at infinite conjugates (i.e. with collimator 5 in operative position) an extension bar 87 and collimator bar 89 maintain object generator 3 at a predetermined length from axis 85 through the lens pupil.

While not required by the present invention, object generator 3 can be selectively mounted for movement on either of two slideways 91 and 93. Slideway 91 permits rectilinear movement of the object generator in a plane parallel to the principal plane of the test lens, and may be used for measurements at finite conjugates, while slideway 93 permits arcuate movement of the generator, and is usually used for measurements at finite conjugates. Collimator 5, when in use, is also mounted for pivotal movement about the same axis 85 below the test lens of the object generator. Furthermore, the collimator is attached to collimator bar 89 and extension bar 87 in such a manner that the collimator will have the same angular position with respect to the lens as the object generator.

Figure 9:
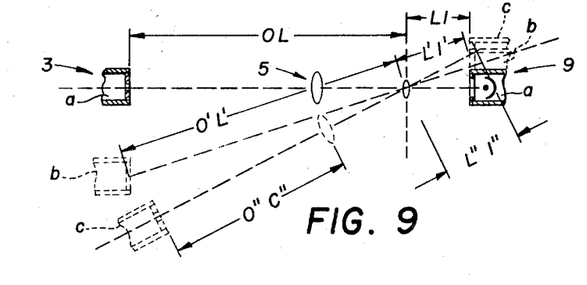
FIG. 9 (sheet 4 of the drawings) is a diagrammatic view representing the manner in which magnification error might occur when the test object is displaced from the optical axis of the test lens.

On FIGS. 1 and 9, object generator 3 and receiver 9 are shown in several different operative positions. A first position $a$, shown in solid lines, is that normally taken by the object generator and the receiver when the lens is tested at finite or infinite conjugates on the optical axis of the test lens. Position $b$, in dotted lines, is the position taken by the object generator and reciever when the lens is tested for finite conjugates (without collimator 5) off the optical axis of the test lens. Position $c$, also shown in dotted lines, is taken by the optical generator and receiver for tests at infinite conjugates off the optical axis of the test lens.

It should be noted that receiver 9 and image slit 67 are usually oriented in planes parallel to the principal plane of the rest of the lens to assure that the test image is sensed in a plane parallel to the principal plane of the test lens. In this manner the ordinary use of the lens in a camera with a flat film plane is closely simulated. Target 17 and object or preslit 23, on the other hand, may be in planes angularly oriented with respect to the lens. Such orientations, for example, are shown at position $c$, which is the normal position for measurements off-axis at infinite conjugates. This angular and off-axis position is required for off-axis measurements at infinite conjugates because of the angular field limitations and the criticality of the infinity focus of collimator 5.

As previously mentioned, the angular relationship between the plane of the object (as defined by the plane of the target) and the plane of the image (as defined by the plane of the receiver) introduces perspective error, while the off-axis position of the object with respect to the lens when test are made at infinite conjugates introduces magnification error.

Perspective error has been found to be function of the cosine of the angle between the object plane and the image or projection plane, and results from the fact that the test lens images the target or object on a plane which is not parallel to the object plane. Thus, the cycles of the target are spread out over an angled projection plane which is longer than a parallel projection plane by the secant of the angle; or the spatial frequency is diminished by the cosine of the angle.

This phenomenon is shown diagrammatically on FIG. 8, wherein line $d$ represents the object plane, line $e$ represents the image plane, and lines $g$—$k$ represent the peak amplitudes of the test object in the area of the image plane. From FIG. 8, it can be seen that the spatial frequency, which varies inversely as the distance between the peak amplitudes $g$—$k$ of the image, will be less when taken along plane $f$ than when taken along plane $e$. With the particular apparatus shown, the object and image planes are always parallel when measurements at finite conjugates are made and no perspective error is present. However, at infinite conjugates, the object and image plane may be skewed with respect to each other and perspective error results.

Magnification error, on the other hand, has been found to be a function of the cosine of the angle by which the test object is displaced from the optical axis of the test lens. This phenomenon is shown diagrammatically in FIG. 9. For finite conjugates on-axis (position $a$) the magnification of the test lens is proportional to distance OL (object to lens) divided by distance LI (lens to image). For finite conjugates off-axis (position $b$) the magnification of the test lens is proportional to distance $0'L'$ divided by distance $L'I'$. With the apparatus shown, this proportion of $0L/LI$ or $O'L'/L'I'$ is constant for all measurement at finite conjugates, i.e. when the object and receiver are in positions $a$ or $b$, and no magnification error is present. However for infinite conjugates the magnification of the test lens is proportional to distance $0''C''$ (object to collimator) divided by distance $L''I''$. In this case, distance $0''C''$ is constant because the object must always be located at the infinity focus of the collimator, but distance $L''I''$ changes as the object generator is moved or displaced off the optical axis. Therefore, magnification error is introduced by such off-axis positioning.

In the apparatus described above, perspective error is present only when the object or preslit is horizontally oriented; that its, when the amplitudes of the frequency components vary in direction of increasing distance between object and image. Magnification error, on the other hand, does not depend upon the orientation of slit 23.

It should now be recognized that perspective error occurs whenever the object and image plane are angled with respect to each other such that the amplitudes of the frequency components of the object vary in the direction of increasing distance between object and image, and magnification error occurs whenever the object is displaced from the optical axis of the test lens and a collimator is positioned between the object and the image. With a bench of the type described, both perspective and magnification error occur when off-axis measurements are made at infinite conjugates with the object slit horizontally oriented. Magnification error will occur when off-axis measurements are made at infinite conjugates with the object slit vertically oriented. Neither error is present when measurements are made at finite conjugates or on the optical axis of the test lens.

In order to correctly account for both of the above-described errors, two function generators such as cosine potentiometers 95 and 97 (see FIGS. 6 and 7) are mounted below the test lens entrance pupil. Cosine potentiometer 95 comprises a slide-wire resistance winding 103 electrically connected at one end to ground and at the other end to a contact $q$ comprising one of the terminals of a single-pole double-throw switch S2. A movable contact arm $s$ of switch S2 is electrically connected to the movable contact arm $p$ of switch S1 and can be positioned to electrically connect contact $q$ to sine-cosine potentiometer 49 for transmitting the output of potentiometer 49 to cosine potentiometer 95. Movable contact arm $s$ can also be positioned in engagement with a contact $r$ comprising the other terminal of switch S2, in order to bypass cosine potentiometer 95 for reasons to become apparent hereinafter. Movable slider contact 99 of cosine potentiometer 95 is electrically connected to a contact arm $w$ movable between contact $t$ and $u$ of a third single-pole double-throw switch S3. Slider contact 99 is movable along winding 103 in response to rotation of shaft 96 and thereby develops a potential at the contact arm $w$ of switch S3 which is related to the angular position of shaft 96. The resistance of winding 103 is arranged so that the potential change introduced by potentiometer 95 will be nonlinear and a cosine function of the angle of rotation of shaft 96 about axis 85.

In a similar manner, cosine potentiometer 97 comprises a slide wire resistance winding 105 electrically connected at one end to ground and at the other end to a contact $t$ comprising one of the terminals of switch S3. Movable contact arm $w$ of switch S3 is electrically connected to slider contact 99 of potentiometer 95 and can be positioned to electrically connect contact $t$ to slide 99 of cosine potentiometer 95 for transmitting the output of potentiometer 95 to potentiometer 97. Movable contact arm $w$ can also be positioned in engagement with a contact $u$ comprising the other terminal switch S3 in order to bypass potentiometer 97 for reasons to become more apparent hereinafter. Movable slider 101 of cosine potentiometer 97 is electrically connected to the x-axis plates of a readout device 11, and is movable along winding 105 in response to rotation of shaft 96 to develop a potential which is related to the angular position of shaft 96. The resistance of winding 105 is arranged so that the potential change resulting from potentiometer 97 will be nonlinear and a cosine function of the angle of rotation of shaft 96 about axis 85.

In the disclosed embodiment, the angular movement of the potentiometer slides will be proportional not only to the displacement of the object generator off the optical axis of the test lens but also to the angular rotation of the object plane with respect to the image plane. Thus, the first potentiometer 95 can be used to correct for perspective error, which is a function of the angle between the object plane the image plane, while the second potentiometer 97 can be used to correct for magnification error, which is a function of the amount of off-axis displacement of the object with respect to the optical axis of the test lens.

The signal from the sine-cosine potentiometer 49 representing the actual spatial frequency of the test object, can be fed by switching means S1 and S2 to one or both of said cosine potentiometers or both cosine potentiometers can be entirely bypassed. When used, the one cosine potentiometer modifies the input as function of the cosine of the angle by which the test object is displaced from the optical axis of the test lens, while the other cosine potentiometer modifies the signal as a function of the cosine of the angle by which the object plane is skewed with respect to the image plane. Since the errors introduced by off-axis measurements vary by these same functions, the outputs from the potentiometers will represent the spatial frequency actually seen by the test lens and receiver.

In the case where object slit 23 is horizontally oriented, and off-axis measurements are made at infinite conjugates, switches S2 and S3 are in the positions shown on FIGS. 6 and 7, engaging contacts $q$ and $t$. Thus, both potentiometers 95 and 97 are connected in series to correct for both perspective and magnification error. When object slit 23 is vertically oriented, switch S3 can be moved to contact $u$ such that only potentiometer 95 is used only magnification error is corrected for. When the object and image are in parallel planes and the object is on the optical axis of the test lens, contact arm $s$ of switch S2 is moved to contact $r$ to bypass both potentiometers. Similarly, when the collimator 5 is removed, and measurements are made at finite conjugates, contact arm $s$ is moved to contact $r$ to bypass both potentiometers. It should be apparent to those skilled in the art that potentiometers could be effectively bypassed without switches S1 and S2, by moving slides 99 and 101 to the ends of windings 103 and 105 remote from ground.

In order to provide a visual readout, the electrical signal representing the intensity components of the image formed by the test lens is fed to an electrical calculator or computer where the MTF is calculated by dividing the peak amplitudes by the average amplitude. This MTF signal is then fed, for example, to the y-axis electrodes of a mechanical plotter. The electrical signal representing the spatial frequency of the test object, as seen by the test lens, if fed to x-axis electrodes of the plotter, presenting on the plotter a visual image of the Modulation Transfer Function of the test lens over a range of spatial frequencies of the test object. In a similar manner the transfer function can be visually presented on the screen of a cathode ray oscilloscope.

Figure 10:
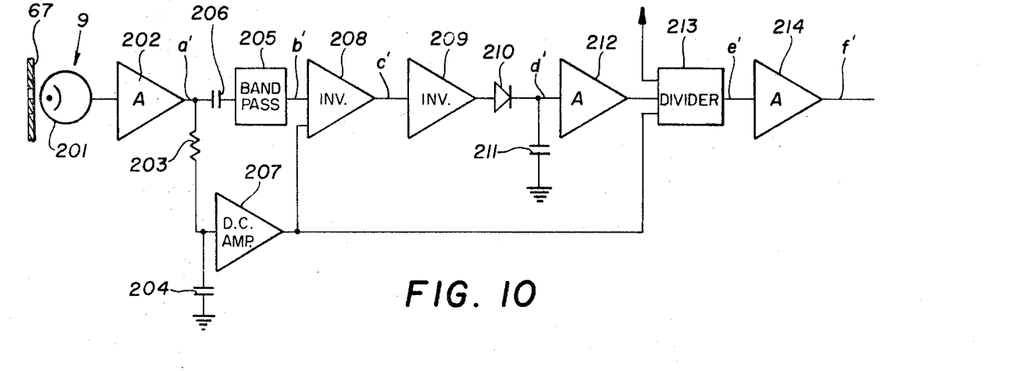
FIG. 10 is a schematic diagram of an electrical circuit arrangement for sensing the amplitudes of the test image and for calculating and representing the MTF value of a test lens.
Figure 11A:
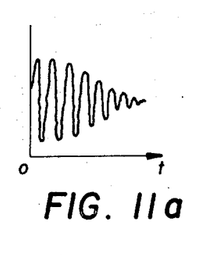
FIG. 11a, 11b, 11c, 11d, 11e, and 11f are traces representing electrical signals at points $a'$, $b'$, $c'$, $d'$, $e'$, and $f'$ of the electrical circuit of FIG. 10.
Figure 11B:
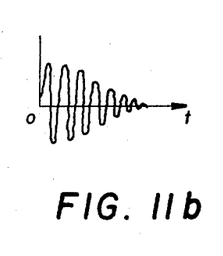
Figure 11C:
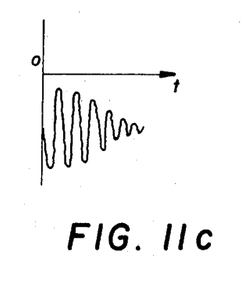
Figure 11D:
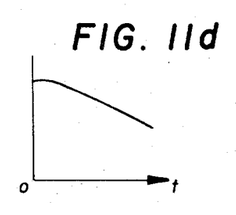
Figure 11E:
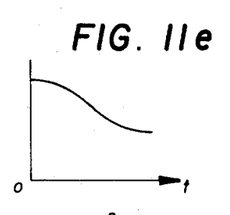
Figure 11F:
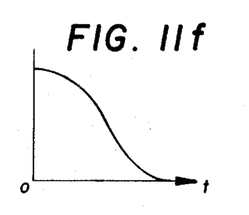

Referring to FIG. 10 there is shown a block diagram of the circuitry of the instruments for sensing the intensity components of the test image and calculating the MTF of the test lens. The image formed by the test lens at slit 67 is scanned in the manner previously described before a photocell (photovoltaic, photoresistive or phototransitive), which in the embodiment shown is is a photomultiplier. The photocell or photomultiplier 201 generates an output signal representing the image which is fed to a preamlifier 202. Part of the output of amplifier 202 is fed to a low pass network consisting of resistor 203 and capacitor 204. The other part of the output of amplifier 202 is fed to band pass filter 205 which is here illustrated as being in series with capacitor 206 to show that band pass filter 205 passes AC only. It is, of course, to be understood that capacitor 206 is not actually a circuit component, but represents a situation that only alternating current will pass through band pass filter 205. The low pass filter consisting of resistor 203 and capacitor 204 causes the input to DC amplifier 207 to be substantially the average or DC level of the output amplifier 202. The purpose of band pass filter 205 is, of course, to rid the signal of noise and harmonics. A wave form of the output of amplifier 202 as measured at point $a'$ is shown in FIG. 11a. The output of the band pass filter as measured at point $b'$ is shown in FIG. 11b. The output of band pass filter 205 together with the output of DC amplifier 207 is sent to reconstructing inverter 208 which replaces the DC level which is lost when the signal went through the band pass filter 205. The output of inverter 208 as measured at point $c'$ is shown in FIG. 11c. The signal is then reinverted by inverter 209 and the peak detected by a peak detector network consisting of diode 210 and capacitor 211. Therefore, the signal at terminal $d'$ represents the envelope of the peaks of the original signal wave form and is shown in FIG. 11d. The output of the peak detector is fed to follower amplifier 212 which is in turn fed to the dividend terminal of divider 213. The division terminal of divider 213 is fed by the average or DC level output of amplifier 297. The output $e'$ therefore of divider 213 is the quotient of the output of amplifier 212 divided by the output of amplifier 207 and is shown in FIG. 11e. Finally, the output is amplified by output amplifier 214 to produce the final signal or terminal wave the form of which is shown in FIG. 11f.

The above configuration is necessary because divider 213 will operate only in a very restricted range, i.e., the dividend terminal of the divider must be maintained within a certain very narrow range. For this reason, a DC level is reinserted onto the signal through reconstructing inverter 208 in order that the minimum output from follower 212 will never be left below the minimum for which divider 213 retains its accuracy.

It can therefore be seen that the above circuit provides the desired Modulation Transfer Function (MTF) of the test lens over a range of spatial frequencies of the test object.

Referring now to the overall operation of the optical bench and method in accordance with the present invention, measurements are made on-axis at finite conjugates with the object generator and receiver in positions $a$ as shown on FIGS. 1 and 9. Since no magnification or perspective error is present, contact arm $s$ is moved to engage contact $r$ of switch S2 to bypass both correction potentiometers 95 and 97. Target 17 is orbitally rotated about its center 33 and also about axis 37 to generate and scan an object of varying spatial frequency at object slit 23. The image transmitted by the test lens is sensed by receiver 9 and the MTF of the test lens is electrically calculated by dividing the maximum value of the amplitudes of the image by the average value of the amplitudes as the spatial frequency of the object is varied. Measurements off-axis at finite conjugates are made in a similar manner with the object generator and receiver in positions $b$. However, measurements off-axis at infinite conjugates will not be accurate when the object generator and receiver are in positions $c$ and when a collimator is used, unless magnification and perspective error are taken into account. In order to take such error into account, contact arm $s$ of switch "S2" is moved into engagement with contact $q$. Further, when object slit 23 is horizontally oriented, contact arm $w$ is moved into engagement with contact $t$. In this manner, magnification error and perspective error are corrected for whenever present.

The invention has been described in detail with particular reference to preferred embodiments thereof, but it will be understood that variations and modifications can be effected within the spirit and scope of the invention as described hereinabove and as defined in the appended claims.

I claim:

1. In a method for testing the response of an optical system, which includes the steps of: positioning a spatial-frequency target at a target plane; imaging the target by the optical system under test at an image plane angled with respect to the target plane such that the amplitude of the spatial-frequency target image varies along the direction of increasing distance between the target plane and the image plane; and forming a signal representing the actual spatial frequency of the target; the improvement comprising the step of correcting the signal representing the actual spatial frequency of the target to compensate for perspective error resulting from the angle between the target plane and the image plane.

2. In a method of testing the response of an optical system at an infinite conjugate, which includes the steps of: positioning a spatial-frequency target at a location displaced from the optical axis of the optical system under test; and forming a signal indicative of the actual spatial frequency of the target; the improvement comprising the step of correcting the signal representing the actual spatial frequency of the target to compensate for magnification error resulting from such displacement of the target from the optical axis of the optical system.

3. In a method of testing the response of an optical component which includes the steps of: positioning a spatial-frequency target at a target plane at an infinite conjugate with respect to the optical component; imaging the target by the optical component under test at an image plane angled with respect to the target plane such that the amplitudes of the target image vary along the direction of increasing distance between the object plane and the image plane; and generating a response representing the actual spatial frequency of the target; the improvement comprising the steps of correcting the response representing the actual spatial frequency of the target to compensate for perspective error resulting from the angle between the target plane and the image plane, and correcting the response representing the actual spatial frequency of the target to compensate for magnification error resulting from the displacement of the target from the optical axis of the optical components.

4. A method of testing an optical imaging means having an optical axis, which includes the steps of:
   positioning a variable intensity test object of determinable spatial frequency a predetermined distance off said optical axis;
   forming a test image of the test object by means of said imaging means;
   photoelectrically scanning said test image to establish a first electrical signal representing the test image;
   establishing a second electrical signal representing the actual spatial frequency of the test object;
   modifying said second signal as a function of said predetermined off-axis distance to correct for error due to such off-axis distance; and
   graphically plotting said second signal against said first signal while varying the frequency of said test object.

5. A method of testing optical systems having a principal plane, comprising:
   forming a variable intensity test object of determinable spatial frequency at a plane angularly oriented with respect to the principal plane of a system under test;
   forming a test image of the test object in a plane parallel to the principal plane of the system by means of the system;
   detecting the test image with a photoelectric receiver to form an electrical signal representing the test image;
   generating an electrical signal representing the actual spatial frequency of the test object;
   modifying said signal representing the actual spatial frequency of the test object by a function of the angle between the object plane and the image plane whenever amplitudes of the test object vary along the direction of increasing distance between the object plane and the image plane, to correct for error due to such angle; and
   visually displaying said signal representing the test image and said modified signal representing the spatial frequency of the test object.

6. A method of testing the response of an optical system having an optical axis and a principal plane, comprising:
   forming a variable intensity test object of determinable spatial frequency off the optical axis and at plane angularly oriented with respect to the principal plane of an optical system under test;
   forming a test image of the test object, in a plane parallel to the principal plane of the optical system, by means of the optical system;
   detecting the test image with a photoelectric receiver to form an electrical signal representing the test image;
   generating a signal representing the actual spatial frequency of the test object;
   modifying said signal representing the actual spatial frequency of the test object as a function of the angle between the object plane and the image plane whenever the amplitudes of the test object vary along the direction of increasing distance between the object and image planes and also by the amount the object is off axis from the optical axis of the optical system, to correct for error due to such angle and off-axis amount; and
   comparing said signal representing the test image with the modified signal representing the spatial frequency of the test object.

7. An optical bench for testing lens systems having an optical axis, said bench comprising:

means including one or more lines target discs for forming a test object of determinable and variable spatial frequency;

means for generating a signal representing the actual spatial frequency of said test object;

means for supporting a lens system to be tested;

means for adjusting the position of the test object relative to the lens system for locating the test object off the optical axis of the lens system; and at least one function generator operatively connected to said signal generating means for altering said signal to correct for changes in the spatial frequency of the test object as imaged by the lens system which are due to the test object being located off the optical axis of the lens system.

8. An optical bench for testing lens systems having an optical axis, in accordance with claim 7, wherein said function generator is a cosine potentiometer.

9. An optical bench for testing lens systems having an optical axis, comprising:

means including at least one lined target for forming a test object of determinable and variable spatial frequency in an object plane;

means for establishing a signal representing the actual spatial frequency of said test object;

holding means for locating a lens system to be tested;

means defining an image plane at which the lens system forms an image of the test object;

receiving means for sensing an image of the test object at the image plane;

means for adjusting the test object with respect to the test image to establish an angle between the object plane and the image plane; and at least one function generator operatively connected to said signal generating means for altering said signal to compensate for s changes in the spatial frequency of the test image which are due to the angle between the object plane and the image plane.

10. In an optical bench for testing optical systems having an optical axis and a principal plane, and including a lined test object of variable spatial frequency, electrical means for generating a signal voltage proportional to the variable spatial frequency, means for orienting the test object off the optical axis of an optical system under test and in a plane oriented at an angle to the principal plane of the optical system, the improvement comprising at least one potentiometer means operatively associated with the electrical signal generating means for altering the signal voltage by a cosine function to correct for perspective error resulting from the angle between the object plane and the principal plane and magnification error resulting from the off-axis position of the test object with respect to the optical axis of the optical system.

11. An optical bench, for testing a lens system having an optical axis and a principal plane, comprising:

at least one lined screen defining a plane and for forming a test object of variable spatial frequency;

means for developing a first electrical output indicative of the spatial frequency of the test object;

means for supporting the lens system with the optical axis of the lens system displaced at an angle from the test object and with the principal plane of the lens system oriented at an angle with respect to the plane of said screen, said support means being located with respect to the test object such that the lens system supported thereby will form a test image of the test object;

a photoelectric receiver for sensing a test image formed by the lens system in an image plane parallel to the principal plane of the lens system and for developing a second electrical output indicative of the test image in said image plane;

a first cosine potentiometer electrically connected to said means for developing said first electrical output and having a resistance element and a contact movable relative to said element to develop an output potential related to a function of the cosine of the angle by which the principal plane of the lens system is oriented with respect to the plane of said screen;

a second cosine potentiometer electrically connected to said first potentiometer, and having a second resistance element and a contact movable relative to said element to develop an output potential related to a function of the cosine of the angular amount by which the optical axis of the lens system is displaced from the object;

first switch means for electrically connecting said first potentiometer to said means for developing said first electrical output to correct for perspective error resulting from the angle by which the principal plane of the lens system is oriented with respect to the plane of said screen; and second switch means for electrically connecting said second potentiometer to said first potentiometer to correct for magnification error resulting from the angular amount by which the optical axis of the lens system is displaced from the object.